US010989391B2

(12) United States Patent
Eidam

(10) Patent No.: US 10,989,391 B2
(45) Date of Patent: Apr. 27, 2021

(54) OPTICAL SYSTEM FOR A SPOTLIGHT

(71) Applicant: ZUMTOBEL LIGHTING GMBH, Lemgo (DE)

(72) Inventor: Michael Eidam, Bad Pyrmont (DE)

(73) Assignee: ZUMTOBEL LIGHTING GMBH, Lemgo (DE)

( * ) Notice: Subject to any disclaimer, the term of this patent is extended or adjusted under 35 U.S.C. 154(b) by 0 days.

(21) Appl. No.: 16/827,813

(22) Filed: Mar. 24, 2020

(65) Prior Publication Data
US 2020/0370729 A1 Nov. 26, 2020

(30) Foreign Application Priority Data

May 21, 2019 (EP) ..................................... 19175515

(51) Int. Cl.
*F21V 14/06* (2006.01)
*F21V 3/00* (2015.01)
(Continued)

(52) U.S. Cl.
CPC ................ *F21V 14/06* (2013.01); *F21V 3/00* (2013.01); *F21V 5/045* (2013.01); *F21V 5/008* (2013.01);
(Continued)

(58) Field of Classification Search
CPC ........ F21V 14/06; F21V 14/065; F21V 5/008; G03B 3/02; G03B 3/04; G03B 2205/0046; G02B 7/10; F21W 2131/406
See application file for complete search history.

(56) References Cited

U.S. PATENT DOCUMENTS 4,101,957 A * 7/1978 Chang ................ A61B 1/00188
362/268
4,823,243 A * 4/1989 Weigert .................... F21S 8/00
362/281
(Continued)

FOREIGN PATENT DOCUMENTS

DE 27 57 614 6/1979
JP 2004 119045 4/2004
(Continued)

OTHER PUBLICATIONS

European search report dated Sep. 30, 2019 in parent European Application 19175515.6.

*Primary Examiner* — Alexander K Garlen
*Assistant Examiner* — Colin J Cattanach
(74) *Attorney, Agent, or Firm* — Andrus Intellectual Property Law

(57) ABSTRACT

Optical system (2) for a spotlight (S), comprising a first optical element (3) and a second optical element (4), which are arranged optically one behind the other along a light-radiating axis (A), and an adjustment mechanism (5), which is coupled to the first optical element (3) and the second optical element (4) such that it can move the optical elements (3, 4) along the light-radiating axis (A) in such a way that the optical elements (3, 4) can be moved relative to one another between a distanced position, in which the optical elements (3, 4) are spaced apart along the light-radiating axis (A), and an adjacent position, in which the optical elements (3, 4) are arranged closer to one another than in the distanced position, and wherein the adjustment mechanism (5) is further coupled to the first optical element (3) and the second optical element (4) such that the optical elements (3, 4), when they are in the adjacent position, can be moved together along the light-radiating axis (A) while maintaining said adjacent position. The invention also relates to a light- (Continued)

ing system (1) comprising a spotlight (S) and the optical system (2) according to the invention, and to a method for adjusting a light emission characteristic of a spotlight (S) of the lighting system (1).

14 Claims, 5 Drawing Sheets

(51) Int. Cl.
| | | |
|---|---|---|
| *F21V 5/04* | (2006.01) | |
| *F21Y 115/10* | (2016.01) | |
| *F21W 131/406* | (2006.01) | |
| *G02B 7/10* | (2021.01) | |
| *F21V 5/00* | (2018.01) | |

(52) U.S. Cl.
CPC ...... *F21V 14/065* (2013.01); *F21W 2131/406* (2013.01); *F21Y 2115/10* (2016.08); *G02B 7/10* (2013.01)

(56) References Cited

U.S. PATENT DOCUMENTS

| | | | | |
|---|---|---|---|---|
| 5,068,768 | A * | 11/1991 | Kobayashi | F21S 41/255 |
| | | | | 362/539 |
| 6,004,007 | A * | 12/1999 | Weigert | F21V 13/04 |
| | | | | 362/268 |
| 6,092,914 | A * | 7/2000 | Esakoff | F21V 5/008 |
| | | | | 362/268 |
| 6,174,071 | B1 | 1/2001 | Chan | |
| 10,012,361 | B2 * | 7/2018 | Stavely | F21V 23/003 |
| 2005/0286250 | A1 * | 12/2005 | Tanaka | G02B 7/10 |
| | | | | 362/319 |
| 2011/0305007 | A1 | 12/2011 | Chang | |
| 2016/0061439 | A1 * | 3/2016 | Jurik | F21V 14/00 |
| | | | | 362/96 |
| 2018/0113375 | A1 * | 4/2018 | Hasegawa | G02B 7/04 |
| 2019/0235204 | A1 * | 8/2019 | Ito | G02B 7/023 |

FOREIGN PATENT DOCUMENTS

| | | |
|---|---|---|
| WO | 9967569 | 12/1999 |
| WO | 2004001287 | 12/2003 |

* cited by examiner

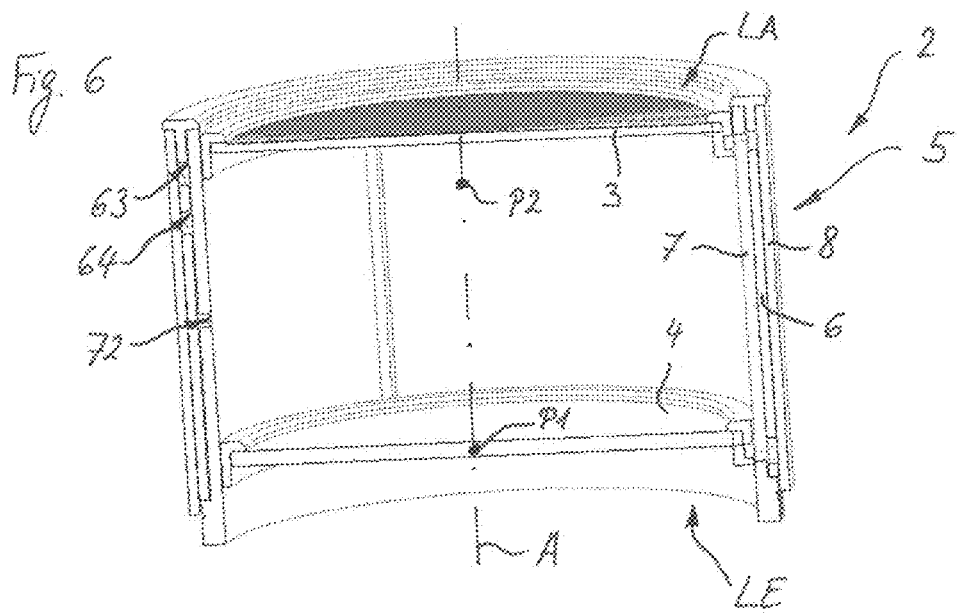
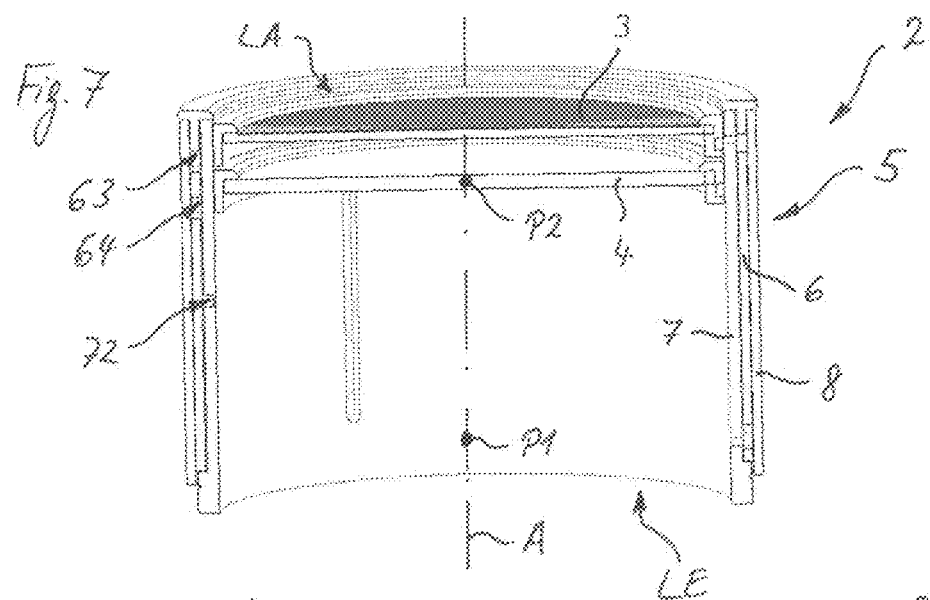
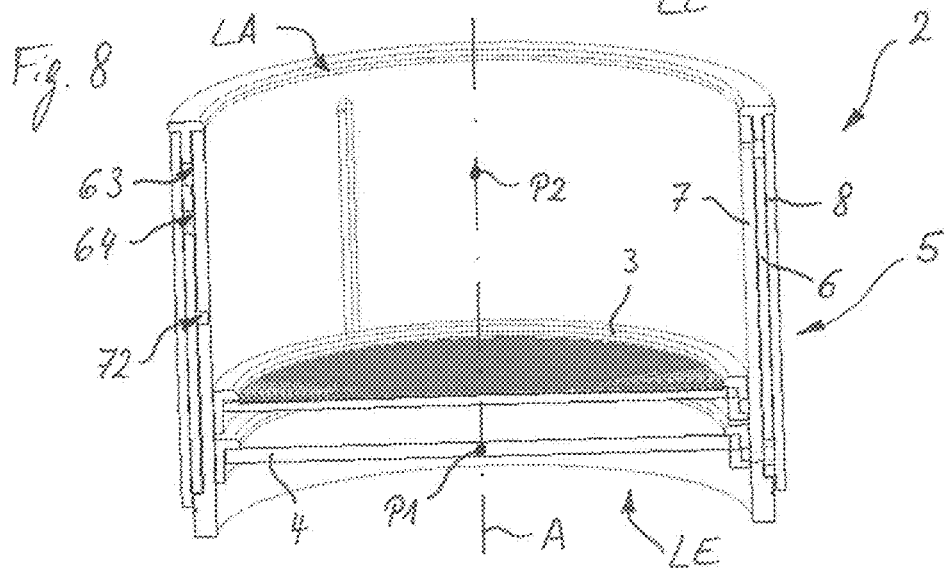

OPTICAL SYSTEM FOR A SPOTLIGHT

CROSS REFERENCE TO RELATED APPLICATION

The present application claims priority to European Patent Application 19175515.6 filed May 21, 2019.

FIELD OF THE INVENTION

The present invention relates to an optical system for spotlights, a lighting system comprising a spotlight and an optical system according to the invention, as well as a method for adjusting a light emission characteristic of a spotlight of a lighting system according to the invention.

BACKGROUND OF THE INVENTION

Spotlights, and optics used to change the light emission characteristics of such lamps accordingly, are fundamentally known. The beam angle of spotlights, for example, can be adjusted with the aid of a zoom lens. Spotlights generally emit a more or less narrow light cone. Said cone usually has a hard edge; regardless of the zoom lens of the beam angle using a zoom lens.

SUMMARY OF THE INVENTION

It is now an object of the present invention to provide an optical system for spotlights, by means of which the light emission characteristics of a spotlight can be made possible in a novel manner and with simple operation.

According to a first aspect, the present invention relates to an optical system for spotlights, comprising a first optical element and a second optical element, which are arranged optically one behind the other along a longitudinal axis or a light-radiating axis, and an adjustment mechanism. The adjustment mechanism is coupled to the first optical element and the second optical element such that it can move the optical elements along the light-radiating axis in such a way that the optical elements can be moved relative to one another between a distanced position, in which the optical elements are spaced apart along the light-radiating axis, and an adjacent position, in which the optical elements are arranged closer to one another than in the distanced position. The adjustment mechanism is further coupled to the first optical element and the second optical element such that the optical elements, when they are in the adjacent position, can be moved together along the light-radiating axis while maintaining said adjacent position.

Using an optical system provided in this manner, a defined setting of a spotlight can be achieved using any selected optical elements. It should in particular be made possible to adjust the optical function of at least one or both optical elements relative to one another via relative movement of the optical elements. By enabling the then joint movement of the optical elements along the light-radiating axis, these effects of the two optical elements can be used and adjusted together in a preferred way. Thus, depending on the optical elements used, different functions can be achieved, as is described in the following by way of example with reference to preferred configurations of the optical elements.

The adjustment mechanism can be configured such that only one of the optical elements, preferably the second optical element, can be moved for the relative movement of the optical elements between the distanced and the adjacent position. For this purpose, the optical element can preferably be movable between a first position, in which it is in the distanced position relative to the other optical element, and a second position, in which it is in the adjacent position relative to the other optical element. This makes it possible to leave the settings, in this case of the first optical element, for example, initially unaffected, and to initially adjust the optical system only with respect to the second optical element.

The adjustment mechanism can further be configured such that, when the optical elements are in the adjacent position, the one optical element can be moved along the light-radiating axis from the second to the first position, and preferably between the first and the second position, while maintaining the adjacent position. In this way, in addition to the adjustment of the second optical element, the joint adjustment of both optical elements can be effected in a further functional range, whereby, during the joint adjustment, the second optical element can preferably also be moved over its entire functional range, which it also traverses during the movement independent of the first optical element.

The optical system can comprise a mounting section. This can preferably be provided on a side which, with respect to the light-radiating axis, faces the one optical element. The mounting section is preferably configured to connect the optical system to a lamp in such a way that the light of the lamp can pass through both optical elements one after the other in the direction of the light-radiating axis, preferably first the second optical element and then the first optical element (alternatively also vice versa). Consequently, the optical system can then be configured such that, if only the second optical element can be moved to move the optical elements between the distanced position and the adjacent position, it is preferably movable in a direction away from and toward the mounting section and, if the two optical elements move together along the light-radiating axis while maintaining the adjacent position, they can move together toward and away from the mounting section. The mounting section thus provides a secure mounting of the optical system relative to a lamp. This should preferably make it possible to align the optical system and the lamp with one another at the same time, in order to provide optimum light emission and adjustment of the light emission characteristics.

The optical elements can respectively comprise guide pins, which preferably extend radially from the respective optical element; particularly preferably radially outward. For this purpose, the adjustment mechanism can comprise a guide element having first and second guide grooves, wherein the guide pins of the first optical element interact, preferably engage, with the first guide grooves and the guide pins of the second optical element interact, preferably engage, with the second guide grooves such that the optical elements can be moved with respect to the light-radiating axis via a rotation relative to the guide element. A coupling between the optical elements and the adjustment mechanism can thus be provided in a simple manner. The configuration of the trajectories or guide grooves in a guide element, in which guide pins of an optical element engage, provides a simple and targeted guidance and thus a corresponding movement of the optical elements along the light-radiating axis, as described above.

The guide grooves can be angled toward one another in a first section, in order to move the optical elements between the distanced and the adjacent position by means of the adjustment mechanism. The guide grooves in a second section can also be parallel to one another, in order to move the optical elements together along the light-radiating axis by means of the adjustment mechanism while maintaining the adjacent position. Simple guide elements can thus be provided in a simple manner. They are also easy to manufacture, so that overall inexpensive production with a simple structure is possible.

In the first section, the first guide grooves of the first optical element, preferably of the further optical element, can extend around the light-radiating axis substantially in a plane orthogonal to the light-radiating axis, and the second guide grooves of the second optical element, preferably of the one optical element, can extend at an angle and around the light-radiating axis. In the second section, the guide grooves of both optical elements can be parallel to one another and also extend around the light-radiating axis at an angle to said axis, preferably mirroring the second guide groove in the first section with respect to a plane which includes the light-radiating axis. In this way, a particularly simple and clear groove guide for the corresponding movement of the optical elements can be provided by means of the adjustment mechanism. It can thus in particular be achieved that, when the optical elements are moved in the first section, only the second optical element is moved due to the angled orientation of its guide groove, while the first optical element remains in the same plane with respect to the light-radiating axis, and while the two optical elements then move together in the second section; here preferably against the direction of the second optical element in the first section.

The guide element can comprise a cam ring, which extends along the light-radiating axis and comprises the guide grooves. A simple component can thus be provided at low cost.

The guide element can comprise an exposed manipulation section, by means of which the guide element can be gripped to effect the relative rotation. The guide element can thus be easily operated by an operator. The manipulation section can comprise corresponding grip-enhancing features or structures, such as a corrugation or a coating that increases friction.

The adjustment mechanism can comprise a holding element, which is provided in a rotatable manner relative to the guide element with respect to the light-radiating axis. The holding element can be coupled to the optical elements and preferably their guide pins such that the optical elements are rotationally fixed with respect to the holding element and mounted in an axially movable manner. This makes it possible for the optical elements to be manipulated or guided in a simple manner with respect to the guide grooves. The holding element thus enables a relative rotation of the optical elements in relation to the guide element in a simple manner, in order to move the optical elements accordingly and preferably guide them in the guide grooves.

For this purpose, the holding element can comprise further guide grooves, which preferably extend parallel to the light-radiating axis. The and/or further guide pins of the optical elements can now interact, preferably engage, with the further guide grooves such that they are mounted in a freely movable manner along the light-radiating axis and the optical elements are moved by relative rotation of the holding element and the guide element in the respective guide grooves. In other words, the further guide groove(s) of the holding element thus serve(s) as torque support.

The holding element can comprise a guide ring, which extends along the light-radiating axis and comprises the further guide grooves. Similar to the cam ring, this component can also be provided in a simple and inexpensive manner.

Like the guide element, the holding element can also comprise an exposed further manipulation section, by means of which the holding element can be gripped to effect the relative rotation. The further manipulation section can be configured like the manipulation section of the guide element.

The adjustment mechanism can also comprise a housing element, which substantially radially delimits the adjustment mechanism to the outside and preferably substantially circumferentially surrounds the outside of the guide element and the holding element. In other words, the housing element thus preferably forms a supporting and, above all, protective component for the entire optical system.

The housing element can comprise a housing ring which extends along the light-radiating axis. Thus, like the cam ring and the guide ring, the housing element can be provided in a simple and inexpensive manner.

The housing element can preferably be coupled to the guide element or the holding element in a rotationally fixed manner. The housing element can thus serve as a further manipulation component for the element that is coupled to it in a rotationally fixed manner.

The exposed manipulation section and/or the exposed further manipulation section can preferably protrude from the housing element, preferably axially, so that it can easily be gripped by an operator. In a particularly preferred configuration, the two manipulation sections can be arranged on opposite axial ends of the housing element. For this purpose, the manipulation sections preferably project (slightly) radially over the housing element and, if necessary, radially outward from it. Overall, the manipulation sections are preferably provided in such a way that they can easily be gripped by an operator and used to rotate the elements of the adjustment mechanism in order to make the operation of the optical system as easy as possible.

The first optical element can comprise an optical lens, preferably a Fresnel lens. The lens can preferably be held in a lens carrier (e.g. a ring that circumferentially surrounds the outside of the lens). The lens carrier can particularly preferably comprise the guide pins of the first optical element. The configuration of the first optical element as an optical lens makes it possible, for example, to equip the spotlight with a zoom function. By moving the first optical element along the light-radiating axis, it can be moved in relation to a spotlight connected to the optical system in such a way that, for example, a beam angle can be narrowed or expanded in order to achieve a zoom effect.

The second optical element preferably comprises a stray disc, particularly preferably a diffusion disc. The stray disc can preferably be held in a carrier (e.g. a ring that circumferentially surrounds the outside of the stray disc). The carrier can particularly preferably comprise the guide pins of the second optical element. Providing the second optical element in the form of a stray disc makes it possible to optionally soften the sharpness of a light cone in the edge region, for example, and thus achieve a so-called "beam shaping" effect.

Combining the optical lens with the stray disc makes it possible for the first time to adjust the edge region of a light cone (beam shaping) both at a fixed beam angle and at the same time together with the beam angle (zoom) in a single adjusting movement. This increases the variability of a lamp equipped with this optical system and at the same time makes it easy to operate.

The optical elements are preferably aligned coaxially with one another. The guide element and the holding element and further preferably also the housing element can likewise be aligned coaxially with one another. The guide element and the holding element, and further preferably also the housing element, particularly preferably have a substantially cylindrical shape. The optical elements are further preferably also aligned coaxially with the adjustment mechanism, preferably to the guide element and the holding element, and further preferably also to the housing element.

According to a further aspect, the present invention further relates to a lighting system with a spotlight and an optical system according to the present invention. The optical system is arranged relative to the spotlight, preferably connected to one another via the mounting section, such that light from the spotlight passes first through the second optical element and then through the first optical element in the direction of the light-radiating axis. In principle, it is also conceivable that the mounting section is provided on the other (axial) side and/or that the optical system is arranged relative to the spotlight such that light from the spotlight passes first through the first optical element and then through the second optical element in the direction of the light-radiating axis. The lighting system can be arranged and configured according to the desired effect.

The spotlight can preferably be an LED spotlight. The spotlight consequently comprises LED means. These can be individual LEDs or any LED modules.

According to a further aspect, the present invention relates to a method for adjusting a light emission characteristic of a spotlight of a lighting system according to the present invention. This comprises the steps for providing said lighting system and for actuating the adjustment mechanism, preferably via a relative rotation of the guide element and the holding element, so that the optical elements can be moved between the distanced position and the adjacent position and, when the optical elements are in the adjacent position, can be moved together along the light-radiating axis while maintaining the adjacent position.

Using this method, which is based in particular on the optical system according to the invention, a light emission characteristic of a spotlight can be set in a particularly simple manner, as previously described.

It is also conceivable that only the second optical element is moved to move the optical elements between the distanced position and the adjacent position. For this purpose, the second optical element can preferably be moved relative to the spotlight, either away from or toward it, i.e. in a direction away from or toward the spotlight. In this way, at least in a first adjustment range, an adjustment of the light emission can be effected solely by means of the second optical element while maintaining the optical function of the first optical element. In the case of a given light cone of a spotlight, for example, the edge region can be optically softened as desired.

When the two optical elements move together along the light-radiating axis while maintaining the adjacent position, both optical elements can be moved relative to the spotlight, either away from or toward said spotlight; i.e. in a direction away from or toward it. This second adjustment step is intended to make it possible to implement the adjustment function of the two optical elements in a coupled manner, for example to control a light cone in the edge region (beam shaping) and the beam angle (zoom) with a single adjusting movement.

BRIEF DESCRIPTION OF THE DRAWINGS

Further advantages and configurations of the present invention are described in the following on the basis of a design example according to the figures of the accompanying drawings. The figures show:

FIG. 6 is a perspective sectional view of an optical system according to FIG. 1 in a first adjustment position of the optical elements in a distanced position, here for example to create a narrow beam angle with a hard edge region, FIG. 7 is a perspective sectional view of the optical system according to FIG. 6 in a second adjustment position of the optical elements in an adjacent position, here in an end facing away from a light entry area, for example in order to obtain a soft edge region at a narrow beam angle, and FIG. 8 is a perspective sectional view of an optical system according to FIG. 6 in a third adjustment position of the optical elements in an adjacent position at an end facing the light entry area, for example to achieve a broad beam angle with a soft edge region.

DETAILED DESCRIPTION

Figure 1:
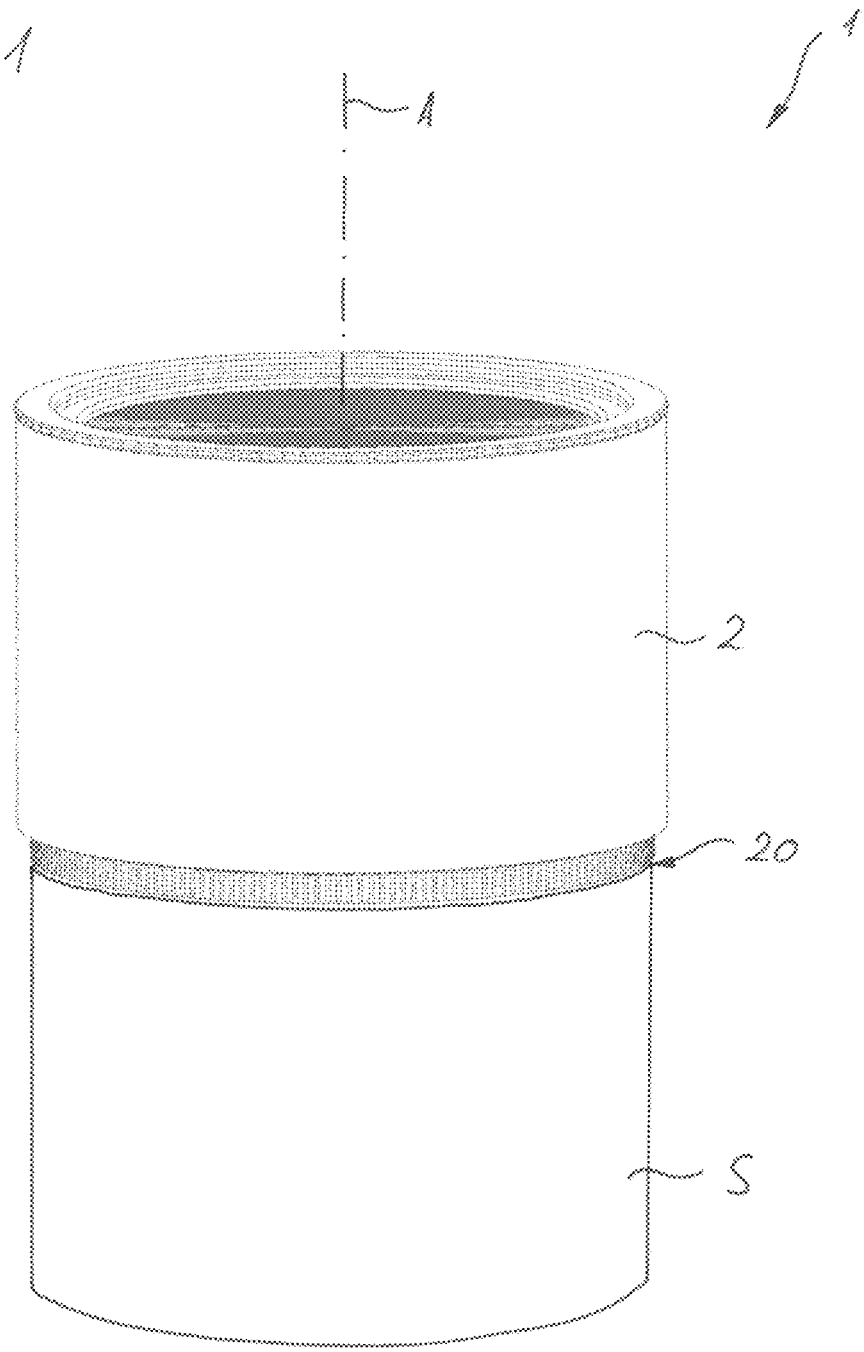
FIG. 1 is a perspective view of a lighting system according to a first design example of the present invention.
Figure 2:
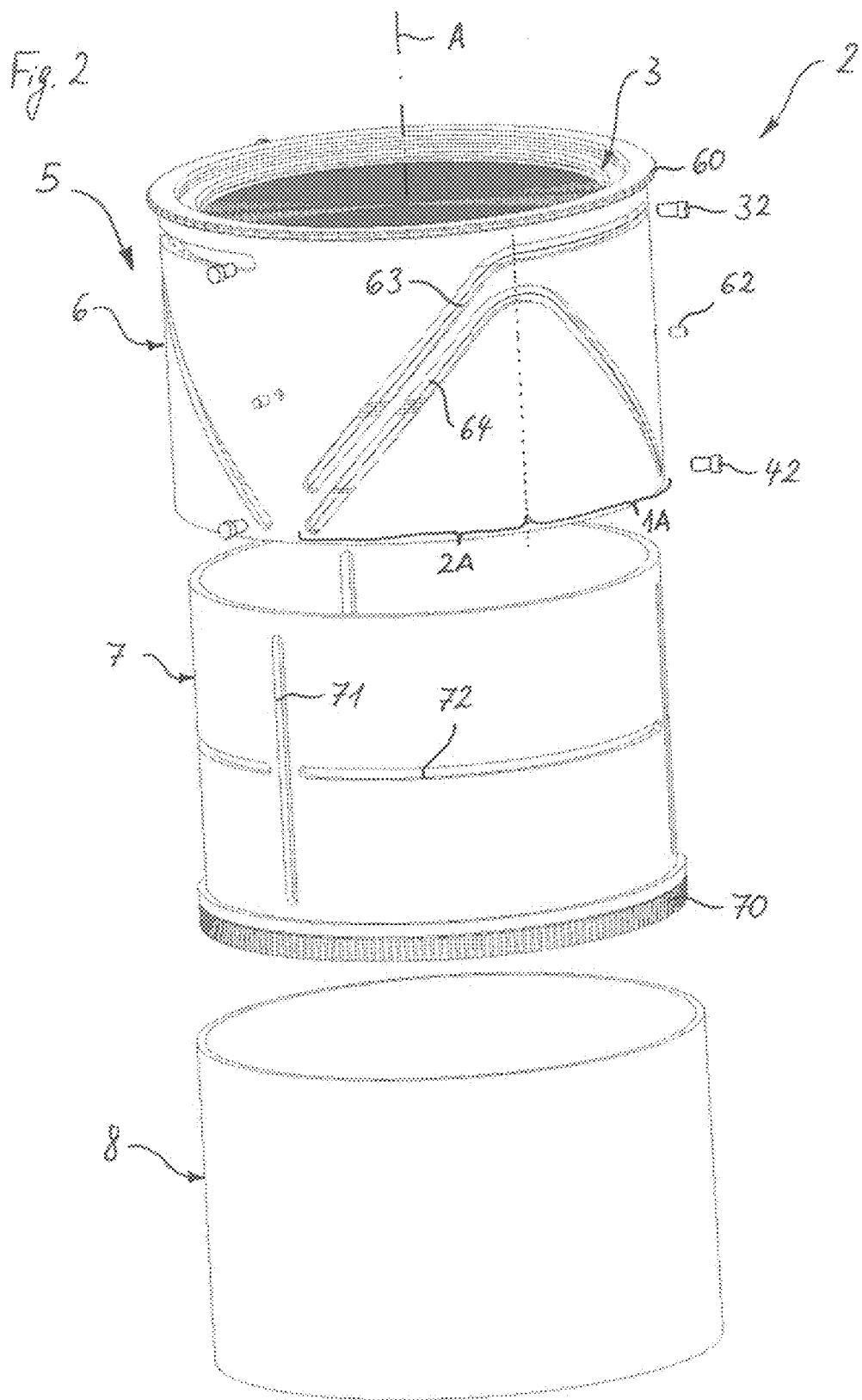
FIG. 2 is a perspective exploded view of an optical system of a lighting system according to FIG. 1.
Figure 3:
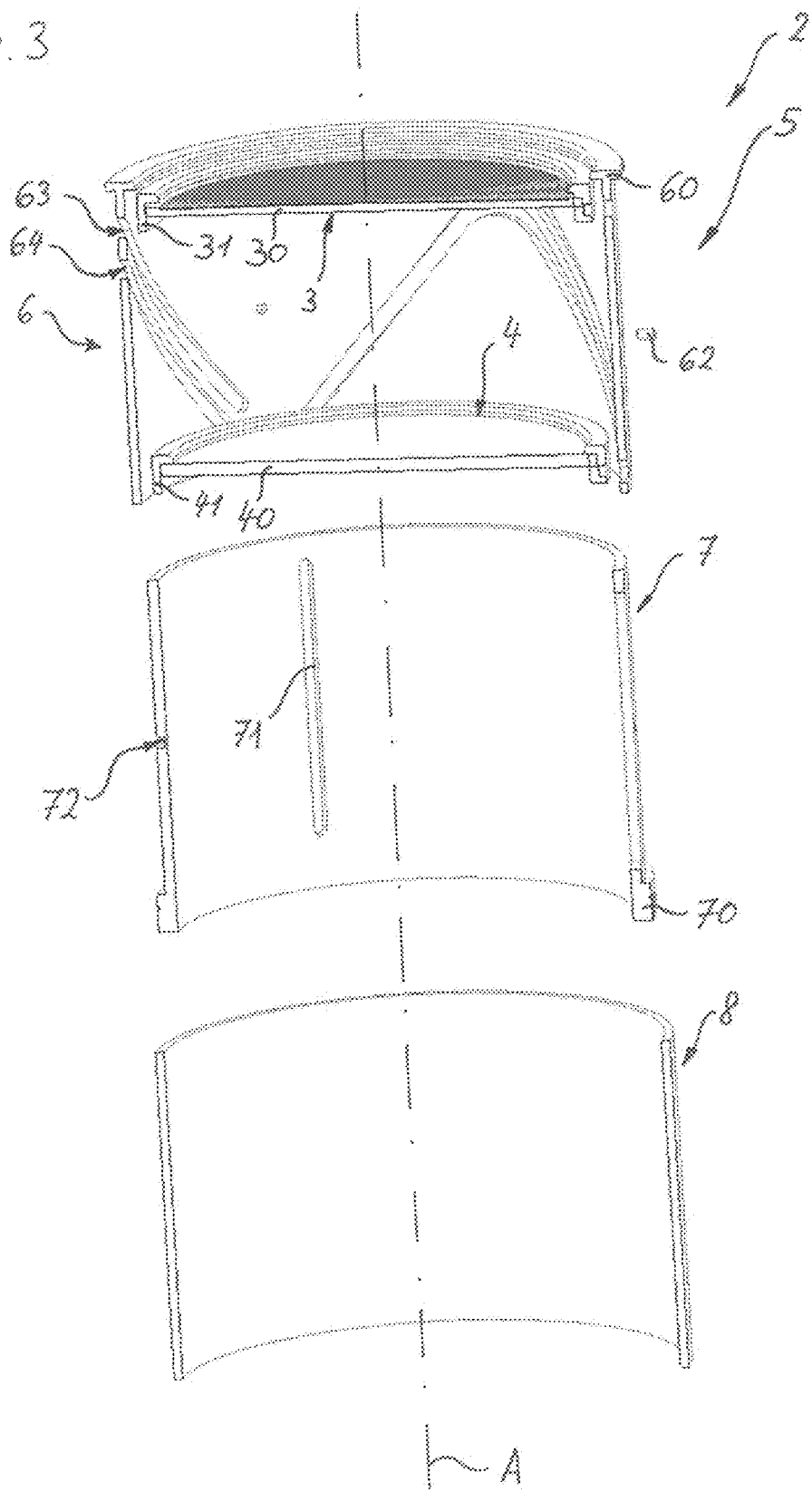
FIG. 3 is a perspective sectional view of the illustration according to FIG. 2.

The figures show an optical system 2 for spotlights S according to the present invention.

As can be seen in particular from the sectional views of FIGS. 3 and 6 to 8, the optical system 2 comprises a first optical element 3 and a second optical element 4. The optical elements 3, 4 are arranged optically one behind the other along a light-radiating axis A. This can be easily seen in FIGS. 6 to 8, for example. The optical system 2 preferably comprises a light entry area LE for coupling light into the optical system 2 and a light exit area LA for decoupling light out of the optical system 2 after it has optically passed through the optical system 2 and thus the optical elements 3, 4.

The first optical element 3 can comprise an optical lens 30, such as a Fresnel lens. The lens 30 can preferably be held in a lens carrier 31, which in this case is configured as a ring 31 that circumferentially surrounds the outside of the lens 30. As shown, the lens carrier 31 in this case preferably surrounds the lens 30 in a quasi-annular manner. The second optical element 4 can comprise a stray disc 40, for example a diffusion disc. The stray disc 40 can likewise preferably be held in a carrier 41; this is comparable to the combination of lens 30 and lens carrier 31, as described above. The carrier 41 can thus also be designed as a ring that circumferentially surrounds the outside of the stray disc 40.

The optical system 2 also comprises an adjustment mechanism 5. The adjustment mechanism 5 is coupled to the first optical element 3 and the second optical element 4 such that it can move the optical elements 3, 4 along the light-radiating axis A in such a way that the optical elements 3, 4 can be moved relative to one another between a distanced position (see FIG. 6, for example), in which the optical elements 3, 4 are spaced apart along the light-radiating axis A, and an adjacent position (see FIG. 7, for example), in which the optical elements 3, 4 are arranged closer to one another than in the distanced position. The adjustment mechanism 5 is further coupled to the first optical element 3 and the second optical element 4 such that the optical elements 3, 4, when they are in the adjacent position, can be moved together along the light-radiating axis A while maintaining said adjacent position as is evident when looking at FIGS. 7 and 8, for example. The optical elements 3, 4, and the adjustment mechanism 5 are preferably aligned coaxially with one another.

The adjustment mechanism 5 can be configured such that only one of the optical elements, in this case preferably the second optical element 4, can be moved for the relative movement of the optical elements 3, 4 between the distanced and the adjacent position. This is evident from a combination of FIGS. 6 and 7, for example. For this purpose, the (second) optical element 4 can preferably be movable between a first position P1, in which it is in the distanced position relative to the other (first) optical element 3, and a second position P2, in which it is in the adjacent position relative to the other (first) optical element 3. Thus, while maintaining the optical influence on the, in this case first, optical element 3, the second optical element 4 can be moved along the light-radiating axis A in order to implement the optical function of the second optical element 4 and to adjust or change a light emission characteristic of a lamp S coupled to the optical system 2.

The adjustment mechanism 5 can be configured such that, when the optical elements 3, 4 are in the adjacent position, the one (second) optical element 4 can be moved along the light-radiating axis A from the second P2 to the first position P1, and preferably between the first and the second position P1, P2, while maintaining the adjacent position. Therefore, as shown by FIGS. 6 and 7, one of the optical elements 4 is first moved toward the other optical element 5. This is followed by a joint movement of the two optical elements 3, 4, in this case preferably against the previous movement of the one optical element 4, as can clearly be seen from a combination of FIGS. 7 and 8, for example.

The optical system 2 can comprise a mounting section 20 to connect the optical system 2 to a lamp S in such a way that the light of the lamp S can pass through both optical elements 3, 4 one after the other in the direction of the light-radiating axis A, preferably first the second optical element 4 and then the first optical element 3. For this purpose, the mounting section 20 can preferably be provided on a side which, with respect to the light-radiating axis A, faces the one (in this case the second) optical element 4. The mounting section 20 is therefore provided in a light entry area LE of the optical system 2.

As can in particular be seen when viewing FIGS. 6 to 8 together, it can thus be made possible to initially move only the second optical element 4 by means of the adjustment mechanism 5 in order to move the optical elements 3, 4 between the distanced position and the adjacent position; in this case then away from the mounting section 20. Both optical elements 3, 4 are then preferably moved back toward the mounting section 20 when the two optical elements 3, 4 move together along the light-radiating axis A by means of the adjustment mechanism 5 while maintaining the adjacent position.

The optical elements 3, 4 can respectively comprise guide pins 32, 42, which preferably extend radially from the respective optical element; particularly preferably outward. The lens carriers 31, 41, if present, can preferably comprise the guide pins 32, 42 of the respective optical elements 3, 4.

The adjustment mechanism 5 can comprise a guide element 6 having first and second guide grooves 63, 64. The guide pins 32 of the first optical element 3 can interact with the first guide grooves 63 and the guide pins 42 of the second optical element 4 can interact with the second guide grooves 64 such that the optical elements 3, 4 can be moved with respect to the light-radiating axis A via a rotation relative to the guide element 6. For this purpose, the guide pins 32, 42 can preferably engage with the corresponding guide grooves 63, 64.

The guide grooves 63, 64 can be angled toward one another in a first section 1A, in order to move the optical elements 3, 4 between the distanced and the adjacent position by means of the adjustment mechanism 5. Here, for example, an angle α between the two guide grooves 63, 64 in the first section 1A is 45 degrees. However, the invention is not limited to this. Depending on the angle α, a relative movement of the optical elements 3, 4 toward or away from one another can thus be achieved with a smaller angle of rotation or a correspondingly larger angle of rotation.

The guide grooves 63, 64 in a second section 2A can be parallel to one another, in order to move the optical elements 3, 4 together along the light-radiating axis A by means of the adjustment mechanism 5 while maintaining the adjacent position.

In the first section 1A, the first guide grooves 63 of the first optical element 3, preferably of the further optical element, can extend around the light-radiating axis A substantially in a plane orthogonal to the light-radiating axis A. This is clearly indicated by the horizontal section in FIGS. 4 and 5, for example. Due to the horizontal design with respect to the light-radiating axis A, it is thus made possible that the optical element correspondingly guided in this guide groove 63 is not moved during a rotation relative to the guide element 6 with respect to the light-radiating axis A, but rather maintains its position as shown, for example, by the first optical element 3 in FIGS. 6 and 7.

Figure 4:
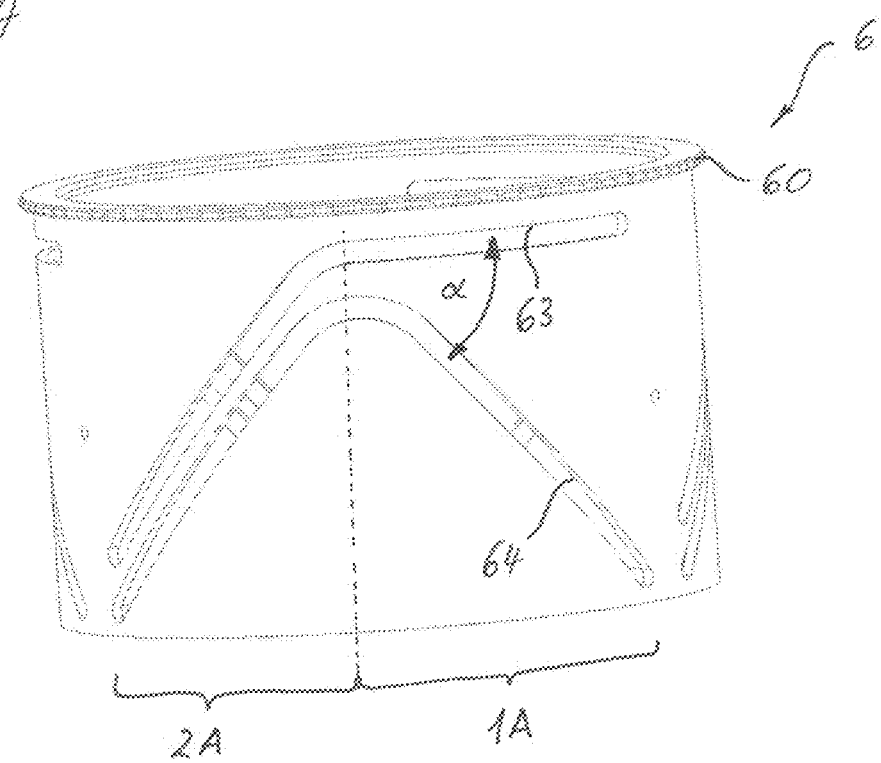
FIG. 4 is a guide element (cam ring) of an optical system according to FIG. 2.
Figure 5:
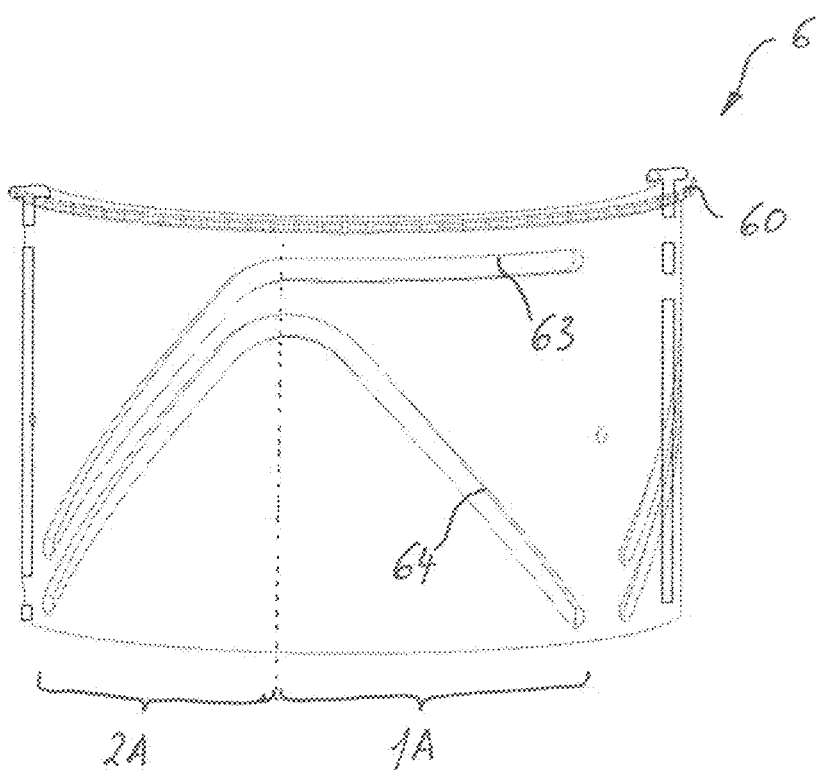
FIG. 5 is a perspective sectional view of the guide element according to FIG. 4.

In the first section 1A, the second guide grooves 64 of the second optical element 4, preferably of the one optical element, can extend around the light-radiating axis A at an angle to said axis, as can also be seen in FIGS. 4 and 5. In this first section, it can thus be made possible to accordingly move the, in this case second, optical element 4 along the light-radiating axis via a relative rotation of the optical elements 3, 4 with respect to the guide element 6, as can also be seen in FIGS. 6 and 7.

In the second section 2A, the guide grooves 63, 64 of both optical elements 3, 4 can be parallel to one another and also extend around the light-radiating axis A at an angle to said axis, as can also be seen in FIGS. 4 and 5. These are preferably mirrored to the second guide groove 64 in the first section 1A with respect to a plane including the light-radiating axis A; thus axially back again. This therefore results in a flat V-shape, or boomerang shape, for the first guide groove 63, while the second guide groove 64 here has a substantially pointed V-shape. The required guiding movement first relatively toward one another and then together can thus be achieved in a simple manner.

The guide element 6 can comprise a cam ring which extends along the light-radiating axis A, in this case cylindrically, and comprises the guide grooves 63, 64, or it can be configured as such. The guide element 6 here is preferably aligned coaxially with the optical elements 3, 4.

The guide element 6 can comprise an exposed manipulation section 60, by means of which the guide element 6 can be gripped and also operated to effect the relative rotation. This is configured here as a radially projecting ring or flange and, for better grip, can comprise a corrugation or the like, for example, or can also be coated or surrounded with an inhibiting material such as rubber.

The adjustment mechanism 5 can also comprise a holding element 7, which is provided in a rotatable manner relative to the guide element 6 with respect to the light-radiating axis A. For this purpose, one of the holding element 7 or the guide element 6 (in this case the holding element 7) can comprise a groove 72, which extends in a plane orthogonal to the light-radiating axis A and in which a pin 62, which is fixedly coupled or integrally formed with the other pin 72 of the other holding element 7 or guide element 6 (in this case the guide element 7), is mounted. A relative rotation of the holding element 7 and the guide element 6 around the light-radiating axis A, while these components 6, 7 are not axially movably or fixedly connected with respect to the light-radiating axis A, is thus made possible.

The holding element 7 can be coupled to the optical elements 3, 4, and preferably their guide pins 32, 42 such that the optical elements 3, 4 are rotationally fixed with respect to the holding element 7 and mounted in an axially movable manner. The optical elements 3, 4 should therefore be taken along when the holding element 7 rotates in the direction of rotation, but still be able to move freely in axial direction along the light-radiating axis A with respect to the holding element 7. The holding element 7 can thus serve as torque support, as will be described below.

For this purpose, the holding element 7 can comprise further guide grooves 71, for example, which preferably extend parallel to the light-radiating axis A. The aforementioned and/or also further guide pins 32, 42, for example of the optical elements 3, 4, can interact, preferably engage, with the further guide grooves 71 such that they are mounted in a freely movable manner along the light-radiating axis A and the optical elements 3, 4 can move or be moved by relative rotation of the holding element 7 and the guide element 6 in the respective guide grooves 63, 64. The further guide pins 71 serve as torque support to take the optical elements 3, 4 with them in the direction of rotation and consequently move them in the guide grooves 63, 64, so that the optical elements 3, 4 can be moved according to the trajectory of the guide grooves 63, 64 with respect to the light-radiating axis A.

The holding element 7 can comprise a guide ring which extends along the light-radiating axis A, in this case cylindrically, and comprises the further guide grooves 71, or it can be configured as such. The holding element 7 here is preferably aligned coaxially with the guide element 6 and further preferably aligned coaxially with the optical elements 3, 4.

Like the guide element 6, the holding element 7 can also comprise an exposed further manipulation section 70, by means of which the holding element 7 can be gripped and also operated to effect the relative rotation.

As can be seen in the figures, the manipulation section 70 here is also provided as a preferably radially projecting flange like the manipulation section 60 of the guide element 6. The further manipulation section 70 can similarly also comprise the grip-enhancing structures or materials.

The adjustment mechanism 5 can furthermore comprise a housing element 8, which substantially radially delimits the adjustment mechanism 5 to the outside, as can be clearly seen in FIG. 1, for example. In a preferred configuration, the housing element 8 substantially circumferentially surrounds the outside of the guide element 6 and the holding element 7, thus forming a type of outer shell or outer housing of the optical system 2. The housing element 8 can be coupled to the guide element 6, as shown, or also the holding element 7, in a rotationally fixed manner. The three cylindrically configured elements (guide element 6, holding element 7, housing element 8) thus result in an overall preferably coaxial ring-like structure, whereby said three cylinders are preferably provided in a nested arrangement in order to form an overall compact optical system 2 in which the components are rotatable relative to one another, as can in particular be seen in FIGS. 6 to 8.

For this purpose, the housing element 8 can comprise a housing ring which extends along the light-radiating axis A, in this case cylindrically, or it can be configured as such. The housing element 8 here is preferably aligned coaxially with the holding element 7 and/or the guide element 6 and further preferably aligned coaxially with the optical elements 3, 4.

Coming back again to the manipulation sections 60, 70, as is evident in particular in FIG. 1 and FIGS. 6 to 8, these can preferably project from housing element 8. In this case, they project preferably axially from the housing element 8. In the design example shown here, the two manipulation sections 60, 70 project from or are arranged on opposite axial ends of the housing element 8, so that they can be gripped and functionally actuated by an operator in a particularly simple manner.

Looking at FIG. 1, it can be seen that a lighting system 1 is shown as well. A lighting system 1 according to the invention comprises the combination of the optical system 2 according to the invention with a spotlight S. The optical system 2 is arranged relative to the spotlight S such that the light of the spotlight S passes first through one of the optical elements, preferably the second optical element 4, and then the other optical element, preferably the first optical element 3, in the direction of the light-radiating axis A. To provide optical system 2 and spotlight S for forming the lighting system 1, these can preferably be accordingly connected to one another via the mounting section 20.

According to a particularly preferred configuration, the spotlight S can be an LED spotlight. Said spotlight then comprises LEDs or LED modules as the lighting means for emitting light. Of course, other lighting means are conceivable as well. In the context of the present invention, a spotlight S is in particular a type of lamp which emits light substantially in one primary emission direction regardless of the beam angle/emission cone, which can be narrow to wide. So-called spot lamps are suitable as such lamps.

A method according to the invention for adjusting a light emission characteristic of a spotlight S of a lighting system 1 according to the present invention will now be described in the following.

A lighting system 1 according to the present invention is initially generally provided. The adjustment mechanism 5 is then actuated in a further step. This is preferably carried out via a relative rotation of the guide element 6 on the one hand and the holding element 7 on the other. As a result of the actuation of the adjustment mechanism 5, the optical elements 3, 4 are moved between the distanced position and the adjacent position and, when the optical elements 3, 4 are in the adjacent position, can be moved together along the light-radiating axis A while maintaining the adjacent position.

Preferably only the second optical element can be moved to move the optical elements between the distanced position and the adjacent position. This preferably relative to the spotlight S, either away from it or toward it, as is evident from the combination of FIGS. 6 and 7 for example.

When the two optical elements 3, 4 move together along the light-radiating axis A while maintaining the adjacent positions, both optical elements 3, 4 can be moved relative to the spotlight S, either away from or toward said spotlight. This is evident from the combination of FIGS. 7 and 8, for example.

After the description of the mechanical adjustment function, the following will describe a resulting example of optical functions on the basis of an exemplary combination of optical element. For this purpose, it will be assumed that the first optical element 3 comprises an optical lens 40, such as a Fresnel lens. As an example here, the second optical element 4 is configured as a stray disc 40 and preferably as a diffusion disc. With reference to FIG. 6, in which the two optical elements 3, 4 are provided in the distanced position, the combination of the optical system 2 with a spotlight S to form a lighting system 1 now results in a spot-like light emission having a narrow beam angle and a simultaneously hard edge region. If the second optical element 4 is now moved toward the first optical element 3 via a rotation of the guide element 6 relative to the holding element 7, and thus away from the spotlight S, the hard edge region of the light cone is softened, thus achieving a so-called "beam shaping" effect. All of this takes place while maintaining the here narrow beam angle because, in this case, the first optical element 3 is not moved relative to the light-radiating axis A and the spotlight S.

This movement allows the light emission characteristic to be changed from the sharpest image of the light cone with a hard edge region while maintaining the beam angle to an increasingly softer image, in particular in the edge region. The edge of the light cone of a spotlight S in the narrowest beam angle (spot), for example, can thus be changed only in its edge region via an adjusting movement on the optical system 2. The transition from light to dark can be changed from abrupt to softly flowing, for example, without changing the actual beam angle of the lamp S. This should preferably take place via a simple (rotational) movement on the optical system 2.

With a further rotation of the guide element 6 with respect to the holding element 7, the two optical elements 3, 4 are then moved back along the light-radiating axis A, i.e. toward the spotlight S, i.e. to the maximum inner position nearest to the lamp, while maintaining the adjacent position. This changes the beam angle from an in this case narrow beam (spot), for example, to an in this case maximum wide beam (flood), for example, depending on the configuration of the optical system. Both adjustment variants should preferably all be able to be made with the same adjusting movement. Therefore, with the present invention, it is possible to preferably control two adjustment properties of a spotlight with only one adjusting movement; in this case, for example, the beam angle (zoom) and the control of the edge region of the light cone (beam shaping). On the other hand, it should also be possible to control only one of these adjustment properties alone and independently of the other with the same adjusting movement; in this case, for example, the control of the edge region of the light cone (beam shaping). All of this with simple operation, simple construction and minimal impact on the lamp design.

The present invention is not limited by the aforementioned design example, provided it is covered by the subject matter of the following claims. It is in particular possible to combine all features of the design example with one another in any manner. It is, for example, possible to use any optical elements 3, 4; depending on the desired light emission characteristics.

The invention claimed is:

1. An optical system (2) for a spotlight (S), comprising: a first optical element (3) and a second optical element (4), which are arranged optically one behind the other along a light-radiating axis (A), and an adjustment mechanism (5), which is coupled to the first optical element (3) and the second optical element (4) such that the adjustment mechanism (5) can move the optical elements (3, 4) along the light-radiating axis (A) in such a way that the optical elements (3, 4) can be moved relative to one another between a distanced position, in which the optical elements (3, 4) are spaced apart along the light-radiating axis (A), and an adjacent position, in which the optical elements (3, 4) are arranged closer to one another than in the distanced position, and wherein the adjustment mechanism (5) is further coupled to the first optical element (3) and the second optical element (4) such that the optical elements (3, 4), when they are in the adjacent position, can be moved together along the light-radiating axis (A) while maintaining said adjacent position, and wherein each optical element (3, 4) comprises guide pins (32, 42), which extend radially from the respective optical element (3, 4), wherein the adjustment mechanism (5) comprises a guide element (6) having first and second guide grooves (63, 64), wherein the guide pins (32) of the first optical element (3) interact with the first guide grooves (63), and the guide pins (42) of the second optical element (4) interact with the second guide grooves (64), such that the optical elements (3, 4) can be moved with respect to the light-radiating axis (A) via a rotation relative to the guide element (6).

2. The optical system (2) according to claim 1, wherein the adjustment mechanism (5) is configured such that, for the relative movement of the optical elements (3, 4) between the distanced and the adjacent position, only one of the optical elements (4, 3), can be moved, wherein for this purpose said one optical element (4, 3) can be moved between a first position (P1), in which said one optical element (4,3) is in the distanced position . . . in which said one optical element (4,3) is in the adjacent position relative to the other optical element (3, 4), wherein the adjustment mechanism (5) is configured such that, when the optical elements (3, 4) are in the adjacent position, the one optical element (3, 4) can be moved along the light-radiating axis (A) from the second position (P2) toward the first position (P1), and between the first and the second position (P1, P2), while maintaining the adjacent position.

3. The optical system (2) according to claim 1, wherein the optical system (2) comprises a mounting section (20), with respect to the light-radiating axis (A) on a side facing the one optical element (4), to connect the optical system (2) to a lamp (S) in such a way that the light of the lamp (S) passes through both optical elements (3, 4) one after the other in the direction of the light-radiating axis (A).

4. A lighting system (1) comprising an LED spotlight, and an optical system (2) according to claim 3, wherein the optical system (2) is arranged relative to the spotlight (S), and connected to one another via the mounting section (20), such that light from the spotlight (S) passes first through the second optical element (4) and then through the first optical element (3) in the direction of the light-radiating axis (A).

5. The optical system (2) according to claim 1, wherein the guide grooves (63, 64) in a first section (1A) are angled toward one another to move the optical elements (3, 4) between the distanced and the adjacent position by means of the adjustment mechanism (5), and wherein the guide grooves (63, 64) in a second section (2A) are parallel to one another to move the optical elements (3, 4) together along the light-radiating axis (A) by means of the adjustment mechanism (5) while maintaining the adjacent position, wherein:

in the first section (1A), the first guide grooves (63) of the first optical element (3), extend around the light-radiating axis (A) substantially in a plane orthogonal to the light-radiating axis (A), and the second guide grooves (64) of the second optical element (4), extend around the light-radiating axis (A) at an angle to said axis, and in the second section (2A), the guide grooves (63, 64) of both optical elements (3, 4) are parallel to one another and also extend around the light-radiating axis (A) at an angle to said axis, mirroring the second guide groove (64) in the first section (1A) with respect to a plane which includes the light-radiating axis (A).

6. The optical system (2) according to claim 1,
wherein the guide element (6) comprises a cam ring, which extends along the light-radiating axis (A) and comprises the guide grooves (63, 64), and
wherein the guide element (6) comprises an exposed manipulation section (60), by means of which the guide element (6) can be gripped to effect the relative rotation.

7. The optical system (2) according to any one of claim 1, wherein the adjustment mechanism (5) comprises a holding element (7), which is provided in a rotatable manner relative to the guide element (6) with respect to the light-radiating axis (A),
wherein the holding element (7) is coupled to the optical elements (3, 4) and their guide pins (32, 42) such that the optical elements (3, 4) are rotationally fixed with respect to the holding element (7) and mounted in an axially movable manner.

8. The optical system (2) according to claim 7, wherein the holding element (7) comprises further guide grooves (71) which extend parallel to the light-radiating axis (A), and wherein the guide pins and/or further guide pins (32, 42) of the optical elements (3, 4) interact, with the further guide grooves (71) such that they are mounted in a freely movable manner along the light-radiating axis (A) and the optical elements (3, 4) move by relative rotation of the holding element (7) and the guide element (6) in the respective guide grooves (63, 64).

9. The optical system (2) according to claim 8,
wherein the holding element (7) comprises a guide ring, which extends along the light-radiating axis (A) and comprises the further guide grooves (71), and
wherein the holding element (7) comprises an exposed further manipulation section (70), by means of which the holding element (7) can be gripped to effect the relative rotation.

10. The optical system (2) according to claim 7, wherein the adjustment mechanism (5) comprises a housing element (8), which radially delimits the adjustment mechanism (5) to the outside and circumferentially surrounds the outside of the guide element (6) and the holding element (7).

11. The optical system (2) according to claim 10,
wherein the housing element (8) comprises a housing ring which extends along the light-radiating axis (A);
wherein the housing element (8) is coupled to the guide element (6) or the holding element (7) in a rotationally fixed manner; and
wherein an exposed manipulation section (60) and an exposed further manipulation section (70) protrude from the housing element (8) axially, and wherein the exposed manipulation section (60) and the further exposed manipulation section (70) are arranged on opposite axial ends of the housing element (8).

12. The optical system (2) according to claim 1,
wherein the first optical element (3) comprises an optical lens (30), which is a Fresnel lens, wherein the lens (30) is held in a lens carrier (31), and wherein the lens carrier (31) further comprises the guide pins (32) of the first optical element (3), and
wherein the second optical element (4) comprises a stray disc (40) which is a diffusion disc, wherein the stray disc (40) is held in a carrier (41), and wherein the carrier (41) further comprises the guide pins (42) of the second optical element (4).

13. A method for adjusting a light emission characteristic of a spotlight (S) of a lighting system (1), comprising the steps:
providing a lighting system (1) according to claim 7,
actuating the adjustment mechanism (5), via a relative rotation of the guide element (6) and the holding element (7), so that the optical elements (3, 4) are moved between the distanced position and the adjacent position and, when the optical elements (3, 4) are in the adjacent position, can be moved together along the light-radiating axis (A) while maintaining the adjacent position.

14. The method according to claim 13,
wherein only the second optical element (4) is moved to move the optical elements (3, 4) between the distanced position and the adjacent position either away from or toward said spotlight, and
wherein, when the two optical elements (3, 4) move together along the light-radiating axis (A) while maintaining the adjacent position, both optical elements (3, 4) are moved relative to the spotlight (S), either away from or toward said spotlight.

* * * * *

UNITED STATES PATENT AND TRADEMARK OFFICE
CERTIFICATE OF CORRECTION

PATENT NO. : 10,989,391 B2
APPLICATION NO. : 16/827813
DATED : April 27, 2021
INVENTOR(S) : Michael Eidam Page 1 of 1

It is certified that error appears in the above-identified patent and that said Letters Patent is hereby corrected as shown below:

In the Claims

In Claim 2, Column 12, Line 33, ". . ." should instead read -- relative to the other optical element (3, 4), and a second position (P2) --.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*